United States Patent
Brown et al.

[11] 3,777,574
[45] Dec. 11, 1973

[54] SPECIFIC GRAVITY SENSOR AND A SYSTEM EMPLOYING THE SENSOR

[75] Inventors: Daniel M. Brown, San Diego; John D. Isaacs, Rancho Santa Fe, both of Calif.

[73] Assignee: The Regents of the University of California, Berkeley, Calif.

[22] Filed: Jan. 4, 1971

[21] Appl. No.: 103,623

[52] U.S. Cl. .................................. 73/453, 250/227
[51] Int. Cl. ........................................... G01n 9/10
[58] Field of Search ..................... 73/32, 440, 451, 73/452, 453, 454, 307–314, 209, 293, DIG. 11; 250/227; 340/249, 282, 380; 136/182; 356/201, 207, 208; 350/96 R, 96 B; 116/118 R; 33/DIG. 3; 200/84 R, 84 A

[56] References Cited
UNITED STATES PATENTS

| | | | |
|---|---|---|---|
| 2,503,091 | 4/1950 | Brooke, Jr. et al. | 73/209 UX |
| 3,120,125 | 2/1964 | Vasel | 116/118 R |
| 3,416,371 | 12/1968 | Locke | 73/209 |
| 1,648,412 | 11/1927 | Linebarger | 73/440 |
| 2,320,720 | 6/1943 | Croft | 73/452 |
| 2,543,522 | 2/1951 | Cohen | 73/452 X |
| 3,523,456 | 7/1970 | Matzen et al. | 73/313 |

Primary Examiner—Charles A. Ruehl
Attorney—Carl R. Brown and Neil F. Martin

[57] ABSTRACT

A specific gravity sensor that is disposed in a liquid, the sensor including at least one pair of vertically extending, light-transmitting elements, one of the elements of the pair having a light-emitting portion submerged in the liquid, which portion is spaced from a confronting light-receiving portion of the other element. Each element has a portion that extends above the liquid and one of those latter portions is subjected to light. A light-flow inhibitor is guided vertically to move upwardly and downwardly between those submerged portions of those elements depending upon the variations in the specific gravity of the liquid and the inhibitor thereby functions to permit and prevent, respectively, the transmission of light therebetween.

The sensor can be employed in a system for controlling mechanism by picking up light rays that emanate from the light-receiving light-transmitting element.

15 Claims, 14 Drawing Figures

INVENTORS
DANIEL M. BROWN
JOHN D. ISAACS
BY Warren H. L. Schmierer
ATTORNEY

INVENTORS
DANIEL M. BROWN
JOHN D. ISAACS
BY *Warren H. F. Schmieding*
ATTORNEY

PATENTED DEC 11 1973 3,777,574

INVENTORS
DANIEL M. BROWN
JOHN D. ISAACS
BY Warren H. L. Schmieding
ATTORNEY

SPECIFIC GRAVITY SENSOR AND A SYSTEM EMPLOYING THE SENSOR

BACKGROUND OF THE INVENTION

1. Field of the Invention

The invention is directed to a sensor for determining the specific gravity of liquid, and to a system in which the sensor is utilized for actuating mechanism, as for example, for the charging of a storage battery by an electric generator which responds to the sensor.

2. Description of the Prior Art

A search through the patented art uncovered the following patents:

| ISSUE DATE | PATENT NO. | PATENTEE |
|---|---|---|
| Sept. 8, 1936 | 2,053,353 | Talbot |
| July 27, 1943 | 2,325,251 | Knisely |
| May 3, 1949 | 2,468,833 | Murphy |
| Mar. 10, 1953 | 2,631,183 | Babis |
| July 22, 1958 | 2,844,532 | White et al. |
| Mar. 5, 1963 | 3,079,887 | Dawkins |
| June 11, 1963 | 3,093,516 | Hennen et al. |
| Mar. 7, 1967 | 3,308,366 | Arpin |
| Sept. 12, 1967 | 3,340,736 | Suematsu |
| Aug. 12, 1969 | 3,460,995 | Webb |
| Mar. 10, 1970 | 3,500,167 | Applegate et al. |
| Apr. 28, 1970 | 3,508,973 | Hicks et al. |

Although these disclosures in the patented art are directed to sensors, none shows a sensor of the type in which a beam of light is interrupted by a light-flow inhibitor which lowers in liquid when the specific gravity of the liquid decreases.

SUMMARY OF THE INVENTION

A light-flow inhibitor lowers and raises in response to decreasing and increasing, respectively, of liquid and, therefore, is capable of interrupting a beam of light. The beam of light is conveyed through two light-transmitting elements. These elements extend vertically into liquid, the specific gravity of which liquid is to be measured and controlled. The light-transmitting elements are light shielded from one another except at selected confronting portions thereof. A guide is provided for guiding the vertical movement of the inhibitor. When the inhibitor lowers to between the selected confronting portions of the guide, the light beam is interrupted. Thus, by visual observance of the light interruption, steps can be taken to observe the then specific gravity of liquid.

The sensor can also be used in a system for automatically controlling mechanism, for example for controlling the specific gravity of acid or alkaline electrolytic cells, the position of the light-flow inhibitor controlling a battery-charging generator.

Other features and the advantages of the present invention will be apparent from the following description, reference being had to the accompanying drawings wherein preferred embodiments of the invention are illustrated.

DESCRIPTION OF THE PREFERRED EMBODIMENTS

Figure 1:
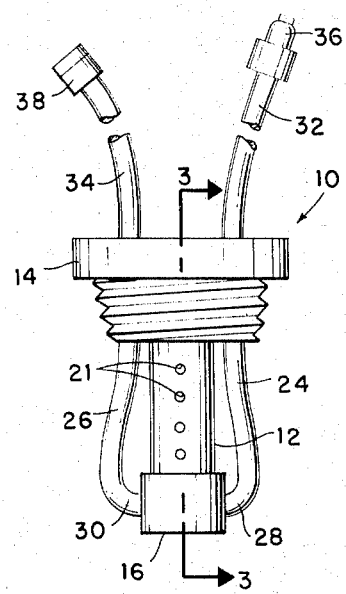
FIG. 1 is a side view of the sensor embodied in a cap for a vessel, the view including also fibre optic tubes, a tube for the member which is movable vertically in response to variation in the specific gravity of liquid, a lamp and a photoelectric cell.
Figure 2:
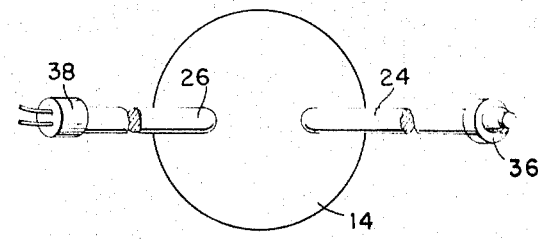
FIG. 2 is a top plan view of the sensor.
Figure 3:
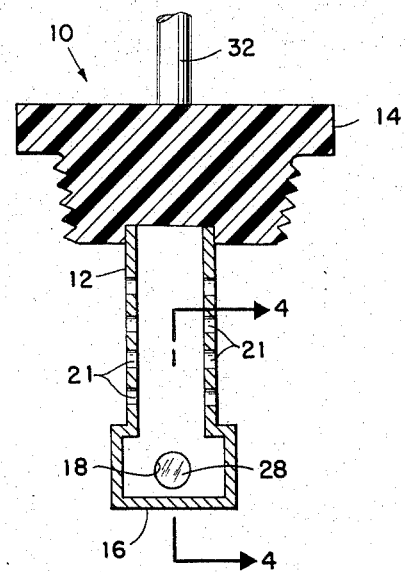
FIG. 3 is a sectional view of the sensor taken along line 3—3 of FIG. 1, but on a larger scale.
Figure 4:
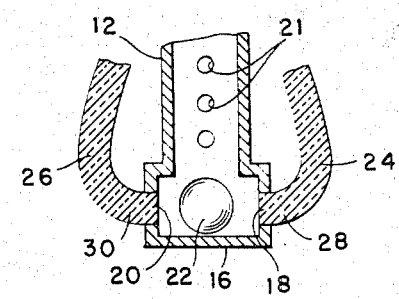
FIG. 4 is a longitudinal sectional view of the tube for the movable member, said member therein and two fibre optic tubes, the view being taken along line 4—4 of FIG. 3.

Referring first to the embodiment shown in FIGS. 1, 2 and 3, the sensor 10 coprises means forming a guide 12 which, for the purpose of illustration, may be formed integrally with a cap 14 for a vessel, as for example the cap for an electrolytic battery. The guide 12 is closed by a bottom wall 16 and is provided with confronting openings 18 and 20 adjacent the bottom thereof. The guide is provided also with holes 21 to insure that the liquid therein has the same specific gravity as that which surrounds the guide.

A light-flow inhibitor 22 in the form of an opaque ball is disposed in and guided vertically by the guide 12, the diameter of the ball being slightly less than the inside diameter of the guide, whereby the ball can move vertically freely within the guide. The density of the ball is such that it lowers and rises in response to the decrease and increase, respectively, of specific gravity of the liquid in which the sensor guide 12 is immersed.

Two vertically disposed light-transmitting elements 24 and 26 in the form of fibre optic tubes are disposed along the outside of the guide 12. The lower exposed ends 28 and 30, respectively, of the fibre optic tubes extend, respectively, into the lower, confronting openings 18 and 20 in the guide 12. The upper ends 32 and 34 of the tubes 24 and 26, respectively, extend through the cap 14 above the liquid.

A source of light, for example lamp 36, is disposed at the upper end 32 of light-transmitting tube 24. In view of the fact that the tubes 24 and 26 are light-isolated from one another, except at their lower portions, and when the beam of light can travel in the space between the lower ends of the tubes 24 and 26, light emanating from the lamp 36 is visible at the upper end 34 of tube 26. However, when a light-flow inhibitor spans the openings 18 and 20 in the guide 12, the beam is interrupted and, consequently, the light from the lamp 36 is not visible at the end 34 of light-transmitting tube 26.

Thus it is apparent that when the specific gravity of liquid, in which the guide 12 is immersed, lowers to a degree in which the opaque ball 22 lowers to a position in which it spans the area between the confronting openings 18 and 20 in the guide, light cannot pass to fibre optic tube 26, with the result that light from lamp 36 is not visible at the upper end 34 of tube 26.

The commercial hydrometers not present on the market require direct access to the vessel containing the liquid, the specific gravity of which is to be observed.

The present invention provides for observing from a remote position whether or not the specific gravity is below that which is desirable. Thus, the invention has utility in such installations in which the liquid-containing vessel is remote from the observer.

Attempts have been made to indicate lowering of specific gravity by floating a sensor which, when it lowers from its floating position, signifies a decreasing of specific gravity. Such sensors are not practical for two reasons, namely: (1) the density ball must exert a sufficient buoyancy force to operate a switch, resulting in the requirement of a massive float which displaces too much liquid, for example too much electrolyte in a storage battery; and (2) a floating indicator is subjected to the sloshing of the liquid in a moving vehicle, resulting in opening and closing of the switch unnecessarily.

In practicing the present invention, specific gravity decreasing is observed by the sinking of the indicator and the indicator is not subjected to sloshing of the liquid; nor need it be of such large mass that is necessary to operate switching mechanism.

In those prior art systems employing electrical equipment for testing the voltage of an electric battery, a heavy discharge load is necessary to obtain accurate voltage measurement. Such heavy discharge not only drains power from the battery, but causes undesirable arcing and failure of switches, both of which cause trouble, for example in submarines.

In practicing the visual indication principal of the present invention, switching to determine the condition of the battery is eliminated.

Referring to the embodiment shown in FIGS. 6 through 10, the sensor 110 is provided with a guide 112 which is formed integrally with a cap 114 for a vessel. The guide is provided with a bottom wall 116 and with a pair of confronting openings 118 and 120 adjacent the bottom thereof. The guide is also provided with holes 121 thus insuring that the liquid therein has the same specific gravity as that which surrounds the guide.

The guide is also provided with pairs of confronting openings 123–125 and 127–129. The pair of confronting openings 123–125 is disposed at a higher level and laterally of the pair of openings 118 and 120; the pair of confronting openings 127–129 is disposed at a higher level and laterally of the pair of openings 123–125.

A light-flow inhibitor in the form of an opaque ball 122 is disposed in and guided vertically by the guide 112. The ball can move freely vertically in the guide. Like ball 22, the density of the ball is such that it lowers and rises in response to decrease and increase, respectively, of the specific gravity of the liquid in which the guide 112 is immersed.

Two sets of vertically disposed light-transmitting elements, in the form of fibre optic tubes, are disposed along the outside of guide 112. One set includes tubes 124, 135 and 137; the other set includes tubes 126, 141 and 143. The lower exposed ends of tubes 124, 135 and 137 extend, respectively, into openings 118, 123 and 127 of guide 112, and the upper portions of said tubes extend through the vessel cap 114. The upper ends of those tubes are subjected to a common source of light, namely to a lamp 136. The lower exposed ends of tubes 126, 141 and 143 extend, respectively, into openings 120, 125 and 129 in the guide 112. The tubes extend through the vessel cap.

When the specific gravity is highest, the ball 122 floats on the surface of the liquid. At that time, all of the areas between the confronting openings transmit light between confronting openings. Therefore, light emanates from the outer ends of the tubes 126, 141 and 143. Should the specific gravity decrease slowly, the beams of light emanating from the ends of tubes 124, 135 and 137 will be interrupted progressively by the slow lowering of opaque ball 122. Thus when ball 122 blocks the area between openings 127 and 129, light fails to emanate from the end of tube 137, and therefore, light will not emanate from the end of optic tube 143, but if light is emanating from the ends of tubes 124 and 135, the observer will be apprised of the fact that the specific gravity has lowered somewhat. Too, when the specific gravity decreases further, ball 122 will block the area between openings 125 and 127 and light will not emanate from tube 141. However, light will now emanate from tube 143 and will continue to emanate from tubes 126 and 143. Further decrease will cause the ball to block the area between openings 118 and 120, resulting in failure of light to emanate from optic tube 126. Finally, when the ball 122 blocks the passage between openings 118 and 120, light will not emanate from the end of optic tube 126. At this time, light emanates from optic tubes 141 and 143. Thus three stages of the specific gravity can be observed visually.

Figure 11:
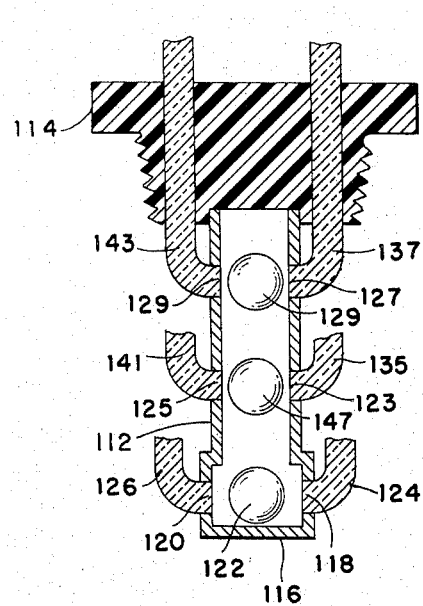
FIG. 11 is a sectional view of another embodiment of the invention.

Referring now to the embodiment shown in FIG. 11, the guide 112 and cap 114 are like those shown in FIGS. 6 through 10, but for simplicity of illustration, the tubes 141, 135, 143 and 137 are not shown as being staggered. In addition to ball 122, the sensor 110 includes two more substantially opaque balls 147 and 149. Each of these balls have different densities. The density of ball 147 is less than that of ball 122; and the density of ball 149 is less than that of ball 147. All balls are buoyed upwardly when the specific gravity is highest. A slight decrease in gravity causes ball 122 to block the lowermost area in the guide, i.e. the area between the openings 118 and 120. Further slight decrease will cause ball 147 to block the area between openings 123 and 125; a still further decrease will cause ball 149 to block the area between openings 127 and 129. Thus, upon continuous decreasing of specific gravity, the lights from optic tubes 126, 141 and 143 will be extinguished sequentially, resulting in apprising the observer of the specific gravities of the liquid.

Figure 5:
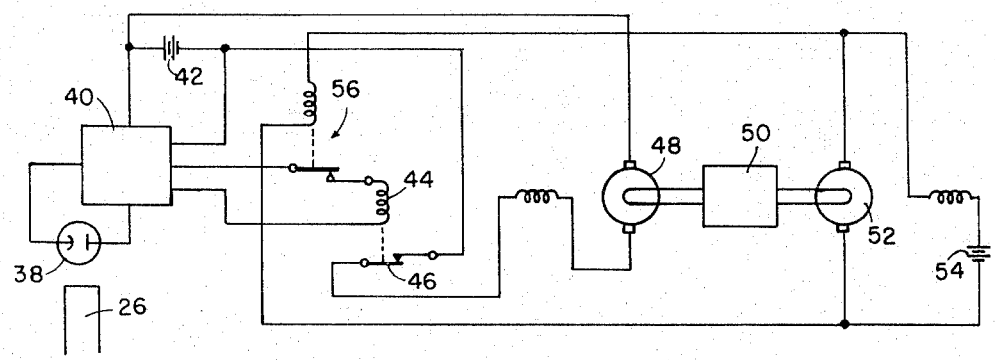
FIG. 5 is a wiring diagram embodying the sensor.

In many cases it is desirable that the specific gravity of the liquid be utilized to operate mechanism for controlling the specific gravity of the liquid or for operating a visible signal or signals or an audible signal or signals. In FIGS. 1, 2 and 3, a photoelectric cell can be used to discern whether or not light is emanating from fibre optic tube 26. As shown diagrammatically in FIG. 5, a photoelectric cell 38 is utilized to control an electric control block 40 which is supplied with current from a battery 42. When no light emanates from fibre optic tube 26, the signal from the cell 38 is interrupted resulting in the control block's energization of a coil 44 to close a switch 46. This switch connects an automobile type engine starting motor 48 to battery 42. Motor 48 cranks an engine 50 to drive a battery charging generating device 52 to the electrolytic type battery 54. A solenoid actuated switch 56 is connected across the generating device and switch 56 functions to disconnect the starting motor 48 after the voltage of the generating device attains a predetermined value. The generating of current will continue until the operator is satisfied that the battery is fully charged, at which time light will be emanating from the fibre optic tube 26. The engine can then be stopped manually.

Figure 12:
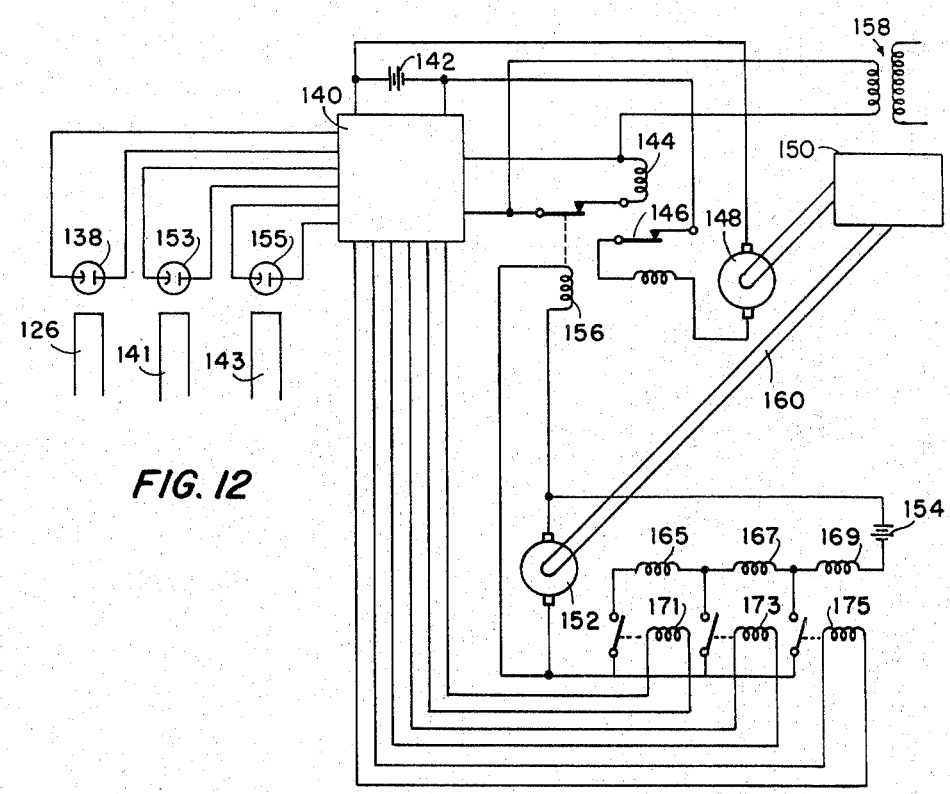
FIG. 12 is a wiring diagram embodying the sensor as a controller for an electric generator.

As shown in the diagrammatic view in FIG. 12, the system employs the sensor 110 shown in FIGS. 6 through 10. In that embodiment, three photoelectric cells 138, 153 and 155 are employed and are responsive sequentially to the lights emanating from fibre optic tubes 143, 141 and 126.

When, for example, the liquid is an electrolyte of a storage battery, the system can control the specific gravity of the battery automatically. Such system is shown in FIG. 12, where the sensor 110, through ball 122, controls the photoelectric cells 138, 153 and 155, which cells sequentially control field windings 165, 167 and 169 of an electric current generating device 152. Thus, if the specific gravity of the battery is at its extreme low stage, at which stage ball 122 is blocking the openings 118 and 120, the current output of the generating device is at its full capacity in that all windings are effective. As the specific gravity increases and the ball 122 rises, the field windings will be progressively disconnected due to the progressive blocking by ball 122 of the areas between the openings 123-125 and 127-129. When the ball rises to its highest position, all photoelectric cells are activated to stop the motor (engine 150) which drives the current generating device 152.

Referring more specifically to FIG. 12, the energizations of photoelectric cells 138, 153 and 155 are through light emanating from fibre optic tubes 126, 141 and 143, respectively. As long as light is emanating from the optic tubes, the generator 152 is active. When the specific gravity of the electrolyte in battery 154 is below a predetermined value, ball 122 will block openings 118 and 120 and the photoelectric cell 138 will be inactive. This inactivity will render the electric control block 140 active through battery 142 to effect energization of switch coil 144 to close switch 146. The closing of switch 146 closes the circuit to the automobile type starting motor 148 that then starts the engine 150, the ignition being supplied through a transformer 158. The engine drives the generator 152 through a shaft 160. When the voltage across the generator attains a predetermined value, electromagnetic switch 156 will interrupt the circuit to coil 144 whereby switch 146 will open to interrupt the flow of current to the starting motor 148.

When the specific gravity is low, all field cois 165, 167 and 169 are energized to supply the full current output to the battery. After the specific gravity increases to a predetermined value, the ball 122 will move upwardly and block the confronting openings 123 and 125 in the guide 112, resulting in the cessation of light emanation from optic tube 141 and cell 153 will become ineffective. Such ineffectiveness is sensed by the electric control block 140 to cause a current flow to a solenoid switch 171 which then disconnects the generator coil 165 thereby decreasing the current output of the generator. Further increase in specific gravity of the electrolyte in battery 154 causes ball 122 to block the confronting openings 127 and 128, resulting in cessation of light emanation from cell 155. This results in the energization of solenoid switch 171, which energization disconnects generator coil 173, resulting in further decreasing of current output of the generator.

From the foregoing it will be apparent that the charging rate of the generator is decreased as the specific gravity of the electrolyte increases. Such decreasing is highly desirable.

When the battery 154 is fully charged, the ball is above the confronting openings 127 and 129 of the guide, whereby light emanates from all optic tubes 126, 141 and 145. The activation of photoelectric cell 153 effects closing of a solenoid switch 175 when field coil 169 is rendered ineffective and the generator ceases to function as such. The cessation of the flow of current effects reclosing of solenoid switch 156 and also effects the discontinuance of current flow through coil 144 of switch 146 whereby the ignition transformer is rendered ineffective.

The same phenomenon takes place when a plurality of balls are employed such as balls 122, 147 and 149 that are shown in FIGS. 6 through 10 and diagrammatically shown in FIG. 12. When the battery electrolyte is too low, all of the balls will have sunk to their lowermost position in which ball 122 blocks the area between openings 118 and 120, ball 147 blocks the area between openings 123 and 125 and ball 149 blocks the area between openings 127 and 129. When those openings are blocked, all field windings will be effected, and as the top ball 149 rises, due to increase in specific gravity, one of the field windings is rendered ineffective. Upon further rises in specific gravity, ball 147 rises, and then ball 122 rises, sequentially, to render the other two windings ineffective, sequentially. When the battery is fully charged, all photoelectric cells are effective and the motor for driving the current generating device is rendered ineffective.

Figure 13:
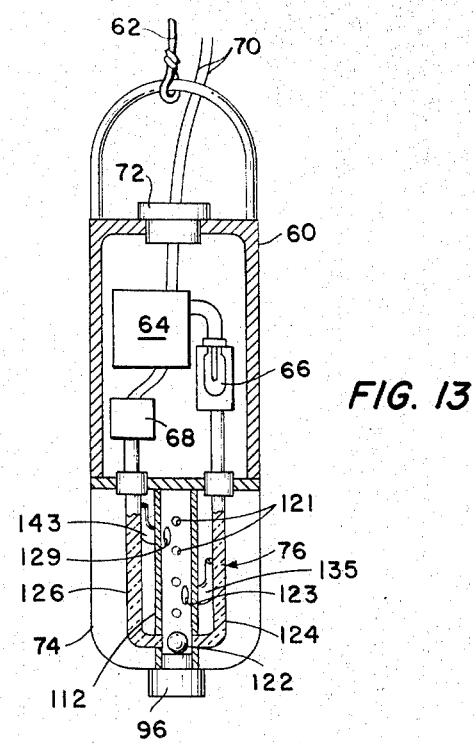
FIG. 13 is a longitudinal sectional view of still another embodiment of the invention, only two of the six fibre optic tubes being shown.

Referring to the embodiment shown in FIG. 13, which is utilized for example for controlling a well pump, that embodiment includes a sealed casing 60 which is connected to a cable 62 and suspended in the well from which a liquid such as water is withdrawn by a pump. A battery or circuit block 64, a lamp 66 and a photoelectric cell 68 are disposed in the casing 60. Wires 70 are connected with the cell 68. These wires extend through a stuffing box 72 to above the ground level.

A cage 74 is suspended from the bottom of casing 60 and a sensor 76 like that shown in FIGS. 6 through 10 is disposed in the casing. The system functions substantially as explained within the description of FIG. 12, except that the sensor controls a pump which is withdrawing, for example, water from a well. The sensor 76 controls the output of a pump 78, shown diagrammatically in FIG. 14 through a standard type charge-rate controller 80.

Should the specific gravity increase in the water, for example if salt water entered the well, the raising of the ball actuates switches sequentially to decrease the pumping action of the pump to thereby decrease the withdrawing of salty water from the area about the well. When all the balls are at their highest positions, the photoelectric cell 155 will function to stop the pumping action.

Figure 14:
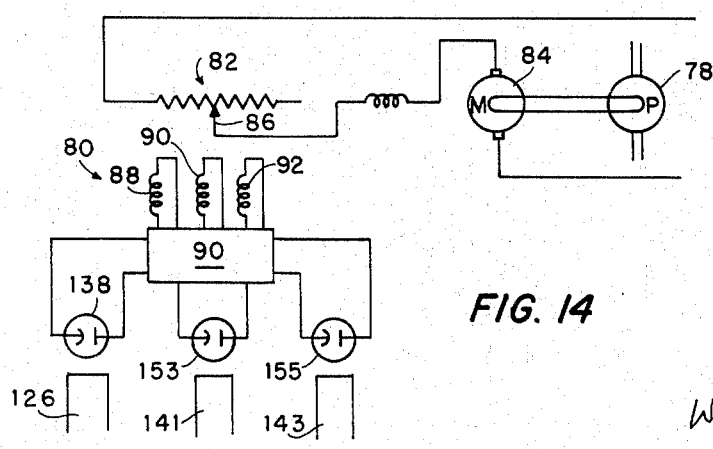
FIG. 14 is a diagrammatic view of a system employing the embodiment shown in FIG. 13.
Figure 6:
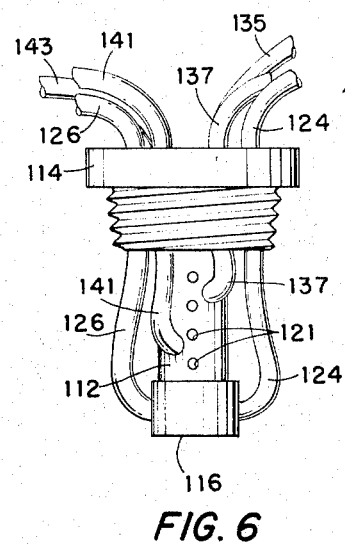
FIG. 6 is a side view of a different embodiment of a sensor.
Figure 7:
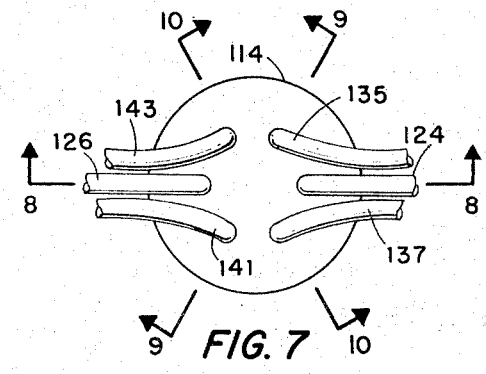
FIG. 7 is a top plan view of the sensor of FIG. 6.
Figure 9:
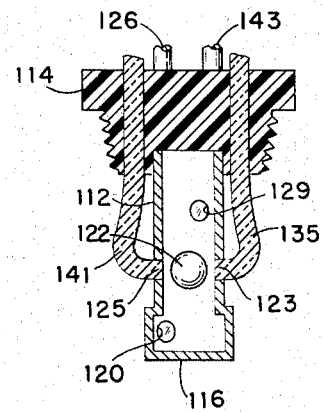
FIGS. 8, 9 and 10 are sectional views taken along lines 8—8, 9—9 and 10—10, respectively, of FIG. 6.
Figure 8:
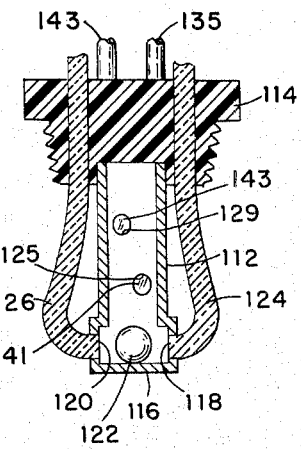
Figure 10:
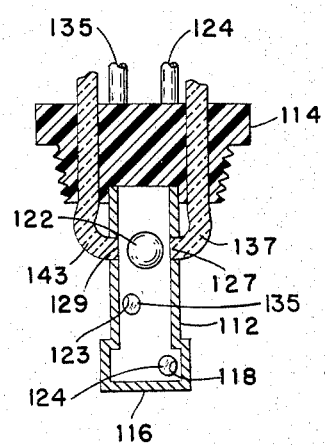

One form of pump control, for illustrative purpose, is shown in FIG. 14 wherein one form of rate control 80 for a motor 84 includes a potentiometer 82, the movable contact 86 being controlled by three solenoids 88, 90 and 92. These solenoids are controlled through the electric control block 94 which in turn is controlled by the photoelectric cells 138, 153 and 155 as explained with respect to FIG. 12. Thus the output of the pump 78 is controlled by the speed of the motor 84.

The bottom wall of the sensor 76 is in the form of a removable plug 96 whereby balls of different densities can be exchanged.

From the foregoing it is apparent that the sensors of the present invention function entirely different from those of the prior art. The sensors achieve results that are more beneficial and less expensive than those of the prior art.

Having described our invention, we claim:

1. A sensor for determining specific gravity, said sensor comprising:
   A. means extendable into liquid that is to be tested for determining the specific gravity thereof, said means forming a guide, said guide having confronting openings;
   B. a plurality of vertically extending, light-transmitting rods, said rods having spaced and confronting portions at said openings in the guide, each of said rods having a portion extending above the liquid;
   C. an opaque hydrometer guided by said means into and out of the area between said openings in the means;
   D. means forming a source of light disposed for transmitting light to the portion of one of the rods that is disposed above the liquid.

2. A sensor as defined in claim 1, characterized in that the confronting openings in said means are immersed in the liquid to be tested.

3. A sensor as defined in claim 1, characterized in that the confronting openings in said means are adjacent the lower end thereof.

4. A sensor as defined in claim 1, characterized to include:
   E. a cap for a vessel, said rods, said first mentioned means, said hydrometer and said cap forming a unit.

5. A system for controlling specific gravity, said system comprising:
   A. means extendable into liquid that is to be tested for determining the specific gravity thereof, said means forming a guide, said guide having confronting openings adjacent the upper end thereof;
   B. a plurality of vertically extending, light-transmitting rods, said rods having spaced and confronting portions at said openings in the guide, each of said rods having a portion extending above the liquid;
   C. an opaque hydrometer guided by said means into and out of the area between said openings in the means;
   D. means forming a source of light disposed for transmitting light to the portion of one of the rods that is disposed above the liquid;
   E. light sensitive means responsive to the light emanating from that portion of the other of said light-transmitting rods that is above the liquid.

6. A system as defined in claim 5, characterized in that the light sensitive means is an electric generator controller, and further characterized to include:
   F. an electric current generator;
   G. an electrolytic cell having negative and positive electrodes connected with the generator;
   H. and means controlled by the generator controller for driving the generator.

7. A system as defined in claim 5, characterized to include:
   F. a cap for a vessel, said rods, said first mentioned means, said hydrometer and said cap forming a unit.

8. A sensor for determining specific gravity, said sensor comprising:
   A. means extendable into liquid that is to be tested for variations in specific gravity thereof, said means forming a guide and having pairs of confronting openings, one pair being disposed at a higher level than the other pair;
   B. a plurality of vertically extending, light-transmitting rods, one of said rods having a portion disposed in light-transmitting relationship with the upper opening of a pair of openings, and another of said rods having a portion disposed in light-transmitting relationship with the lower opening of a pair of openings, each of said rods having a portion extending above the liquid;
   C. a second plurality of vertically extending, light-transmitting rods, one of the latter rods having a portion disposed in light-receiving relationship with the upper opening of the first mentioned pair of openings, another of the latter rods having a portion disposed in light-receiving relationship with the lower opening of the second mentioned pair of openings, each of said rods having a portion extending above the liquid;
   D. an opaque hydrometer guided by said means into and out of the area between said openings in the means;
   E. a second opaque hydrometer guided by said means into and out of the area between the openings in said means, the density of the second mentioned hydrometer being less than that of the first mentioned hydrometer and disposed above the first mentioned hydrometer;
   F. means forming a source of light disposed for transmitting light to the portions of the rods that are disposed above the liquid.

9. A sensor as defined in claim 8, characterized in that the openings of the first pair of openings in the means are disposed laterally of the second pair of openings in the means.

10. A sensor as defined in claim 8, characterized to include:
    F. a cap for a vessel, said first mentioned means, light-transmitting rods, said opaque hydrometers and the cap forming a unit.

11. A system for controlling specific gravity, said system comprising:
    A. means extendable into liquid that is to be tested for variations in specific gravity thereof, said means forming a guide and having pairs of confronting openings, one pair being disposed at a higher level than the other pair;
    B. a plurality of vertically extending, light-transmitting rods, one of said rods having a portion disposed in light-transmitting relationship with the upper opening of a pair of openings, another of said rods having a portion disposed in light-transmitting relationship with the lower opening of a pair of openings, each of said rods having a portion extending above the liquid;

C. a second plurality of vertically extending, light-transmitting rods, one of the latter rods having a portion disposed in light-receiving relationship with the upper opening of the first mentioned pair of openings, another of the latter rods having a portion disposed in light-receiving relationship with the lower opening of the second mentioned pair of openings, each of said rods having a portion extending above the liquid;

D. an opaque hydrometer guided by said means into and out of the area between said openings in said means;

E. a second opaque hydrometer guided by said means into and out of the area between the openings in said means, the density of the second mentioned hydrometer being less than that of the first mentioned hydrometer and disposed above the first mentioned hydrometer;

F. means forming a source of light for transmitting light to the outer portions of those light-transmitting rods employed for transmitting light into the openings in said means;

G. light sensitive means responsive to the light emanating from outer portions of those light-transmitting rods employed for transmitting light from the openings in said first mentioned means.

12. A system as defined in claim 11, characterized in that the light sensitive means is an electric generator controller; and further characterized to include:

H. an electric current generator;

I. an electrolytic cell having negative and positive electrodes connected with the generator;

J. and means responsive to the generator controller for driving the generator.

13. A system as defined in claim 12, characterized to include:

K. light sensitive means responsive to the light emanating from said other light-transmitting rod for controlling said electric generator controller;

L. means forming a source of current for the means that forms the source of light;

M. a sealed casing, said means (F) and (G) being disposed in said casing.

14. A system as defined in claim 13, characterized to include:

N. a cage attached to said casing, said guide and hydrometer being disposed in the cage.

15. A system for controlling specific gravity, said system comprising:

A. means extendable into liquid that is to be tested for variations in specific gravity thereof, said means forming a guide and having pairs of confronting openings, one pair being disposed at a higher level than the other pair;

B. a plurality of vertically extending, light-transmitting rods, one of said rods having a portion disposed in light-transmitting relationship with the upper opening of a pair of openings, another of said rods having a portion disposed in light-transmitting relationship with the lower opening of a pair of openings, each of said rods having a portion extending above the liquid;

C. a second plurality of vertically extending, light-transmitting rods, one of the latter rods having a portion disposed in light-receiving relationship with the upper opening of the first mentioned pair of openings, another of the latter rods having a portion disposed in light-receiving relationship with the lower opening of the second mentioned pair of openings, each of said rods having a portion extending above the liquid;

D. an opaque hydrometer guided by said means into and out of the area between said openings in said means;

E. a second opaque hydrometer guided by said means into and out of the area between the openings in said means, the density of the second mentioned hydrometer being less than that of the first mentioned hydrometer and disposed above the first mentioned hydrometer;

F. means forming a source of light for transmitting light to the outer portions of those light-transmitting rods employed for transmitting light into the openings in said means;

G. light sensitive means responsive to the light emanating from outer portions of those light-transmitting rods employed for transmitting light from the openings in said means;

H. a sealed casing, said means (F) and (G) disposed in the casing;

I. signal transferring means associated with the means (G) and extending out of the casing;

J. means for supporting the casing in the liquid;

K. energy creating means outside of the liquid for controlling the signal transferring means (I).

* * * * *